United States Patent [19]

Dismer

[11] 4,201,197
[45] May 6, 1980

[54] SOLAR ENERGY COLLECTOR HAVING A FIBER-OPTIC CABLE

[76] Inventor: Raymond H. Dismer, 2730 14th Ave., Moline, Ill. 61265

[21] Appl. No.: 888,376

[22] Filed: Mar. 20, 1978

[51] Int. Cl.² .............................................. F24J 3/02
[52] U.S. Cl. .................................. 126/451; 126/439; 350/96.10; 126/440
[58] Field of Search .................. 126/270, 271; 350/96.10, 294, 293, 288

[56] References Cited

U.S. PATENT DOCUMENTS

| | | | |
|---|---|---|---|
| 3,780,722 | 12/1973 | Swet | 126/270 |
| 3,955,554 | 5/1976 | Collie | 126/270 |
| 4,000,733 | 1/1977 | Pauly | 126/270 |
| 4,018,212 | 4/1977 | Hein | 126/270 |
| 4,026,267 | 5/1977 | Coleman | 126/270 |
| 4,055,219 | 10/1977 | Orlandi et al. | 165/134 |
| 4,068,474 | 1/1978 | Dimitroff | 126/271 |

FOREIGN PATENT DOCUMENTS 144349 6/1961 U.S.S.R. ................................. 126/270

*Primary Examiner*—James C. Yeung
*Attorney, Agent, or Firm*—Glenn H. Antrim

[57] ABSTRACT

A paraboloidal mirror collects radiant solar energy and reflects it to a smaller mirror positioned on the directrix of the larger mirror. A fiber-optic cable has one end positioned within an opening in the vertex of the larger mirror, and energy reflected a second time from the smaller mirror is directed to the ends of fibers in the fiber-optical cable. To prevent the formation of destructive hot spots by the focusing of rays that are slanting with respect to the direction of the fibers, the fibers near the end receiving the radiant energy are collected into groups, and an opaque, reflective coating surrounds each of the groups.

1 Claim, 5 Drawing Figures

SOLAR ENERGY COLLECTOR HAVING A FIBER-OPTIC CABLE

BACKGROUND OF THE INVENTION

This invention relates to systems for collecting and transmitting solar energy and particularly to systems having sets of two collecting mirrors and fiber-optic cables.

Many different arrangements have been proposed for collecting solar energy from above the roofs of buildings and transmitting the energy mostly as heat to locations within the buildings. A system described in U.S. Pat. No. 4,026,267 issued to Rich F. Coleman on May 31, 1977 has groups of wide-angle lenses mounted on a roof to focus radiant energy on upper ends of fiber-optic cables. The lower ends of the fiber-optic cables terminate in heat sinks that supply heat to an enclosure. Rather than using lenses, mirrors may be used to concentrate solar energy. The use of multiple mirrors for concentrating solar heat and means for controlling the mirrors to track the sun are shown in U.S. Pat. No. 3,905,352 issued to Arnold Jahn on Sept. 16, 1975. Heat concentrated from a system of mirrors may be applied to a boiler connected to a device for utilizing energy.

SUMMARY OF THE INVENTION

A relatively large mirror or reflector and a small mirror have respective reflective surfaces that are spaced apart a fixed distance and face each other. The radiant energy from the sun is collected by the larger mirror and directed over an area coincident with the reflecting surface of the smaller mirror. A tracking device, such as those presently used for tracking the sun, is connected to the arrangement of mirrors to direct the reflective surface of the larger mirror in the direction of the sun.

The center of the larger mirror has an aperture, and an end of a fiber-optic cable for an input is positioned in the aperture so that the ends of fibers of the cable face the smaller mirror or reflector. The smaller mirror directs the rays that have been focused on it by the larger mirror over an area coincident with the input of the fiber-optic cable. The fibers of the cable have sufficient diameter to transmit a wide spectrum of radiant energy. An end of the fiber-optic cable for an output terminates at a lens to focus energy on a utilizing device. If desired, a pair of adjustable polarized disks can be inserted between the end of the cable and the focusing lens to control the amount of heat that is applied to the utilizing device.

The larger mirror is preferably paraboloidal, and its aperture for receiving the end of the fiber-optic cable for the input is located at the vertex of the mirror. The smaller mirror has a concave face shaped as required to focus radiant energy over an area coincident with the end of the fiber-optic cable. In order to prevent the end of the cable at the input from becoming destructively hot, a metallic heat radiator having fins surrounds the end of the fiber-optic cable, and substantial focusing of heat waves is prevented in the input of the cable. The fibers at the input of the cable are separated into groups, and each group of fibers is surrounded by an opaque, reflective coating. The coating prevents rays from traveling in a slanting direction through the walls of the fibers and focusing energy at points within the end of the cable.

DETAILED DESCRIPTION OF THE PREFERRED EMBODIMENT

Figure 1:
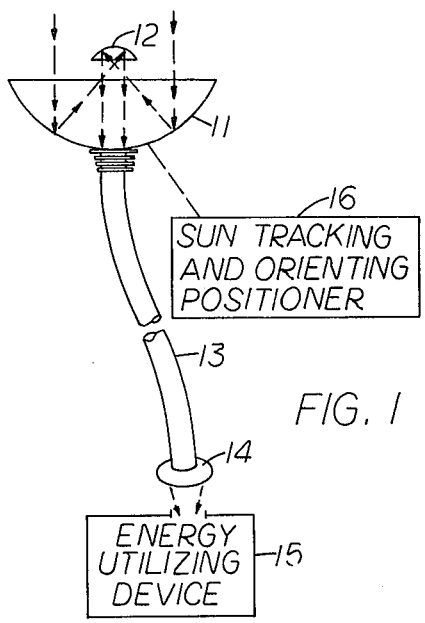
FIG. 1 is a diagram of a solar heat collecting and transmitting system of this invention.

The solar energy system of FIG. 1 comprises a collector having a paraboloidal mirror 11 and an aspherical mirror 12, a fiber-optic cable 13 for transmitting solar energy over a moderate distance, and a focusing lens 14 for concentrating energy on an energy utilizing device 15. A sun tracking and orienting positioner 16 is mechanically connected to the mirror 11 and operates according to known methods to track the sun. The rays of the sun are reflected from the paraboloidal mirror 11 to the mirror 12 that is preferably positioned on the directrix of the mirror 11. The mirror 12 is spaced from the mirror 11 such that its reflective surface coincides with the area over which the rays from the sun are concentrated by the mirror 11.

To transmit energy that is collected by the mirror 11, the fiber-optic cable 13 has an end for an input connected at the vertex of the mirror 11. The cable 13 can be of moderate length for transmitting energy to a location where it can be conveniently used, usually at a location that is lower than the location of the mirrors 11 and 12. The mirror 12 has the proper shape for concentrating the energy received from the mirror 11 over an area that coincides with the area encompassing the ends of fibers at the input of the fiber-optical cable 13. The focusing lens 14 at the other end or output of the fiber-optic cable 13 focuses the radiant energy received from the sun as much as required to provide the desired temperature at the energy utilizing device 15.

The amount of energy at the output of the system is dependent upon the size of the collecting mirror 11 and the diameter of the cable 13 in addition to the focusing power of the lens 14. The heat can be concentrated for operating thermal generators or for melting material such as steel, or less concentrated for heating water. The system could be especially applicable in outer space to provide a continuous source of energy when applied to thermal generators or to other generators. The lens 14 is preferably a plano-convex lens integrated within the end of the fiber-optic cable 13 with the plane portion in contact with the ends of the fibers 24.

Figure 2:
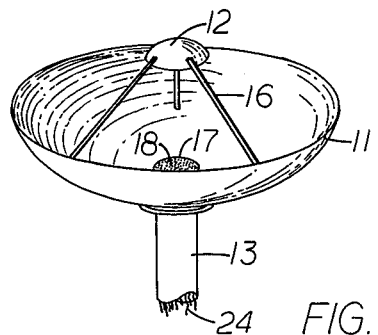
FIG. 2 is a top perspective view of two mirrors in the heat collecting system.

According to FIG. 2, the smaller mirror 12 is supported by members 16 such that the reflective faces of the mirrors 11 and 12 are facing each other. Groups of small mirrors having either plane or curved faces as required might be used in place of the mirrors 11 and 12 providing the mirrors direct energy over areas corresponding to the area of the mirror 12 and the area of the end of the cable 13 respectively. When a paraboloidal mirror 11 is used, it has through its vertex an aperture having a diameter about equal to the diameter of the cable 13. The cable 13 is attached to the mirror 11 to expose ends of fibers 18 to the rays directed by the mirror 12. To avoid destructive heat from the focusing of rays that are not parallel to the fibers 24, the adjacent fibers are arranged into groups that constitute bundles 19.

Figure 3:
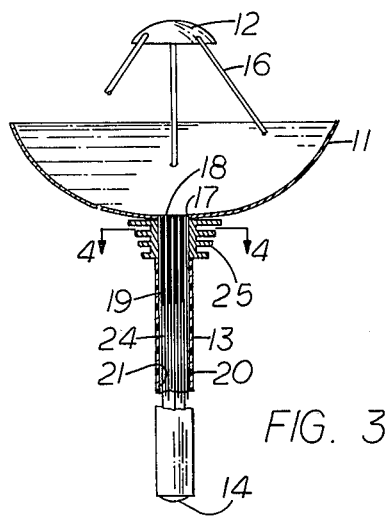
FIG. 3 is a longitudinal cross-sectional view of the larger one of the two heat collecting mirrors and a fiber-optic transmission cable connected to the mirror.
Figure 4:
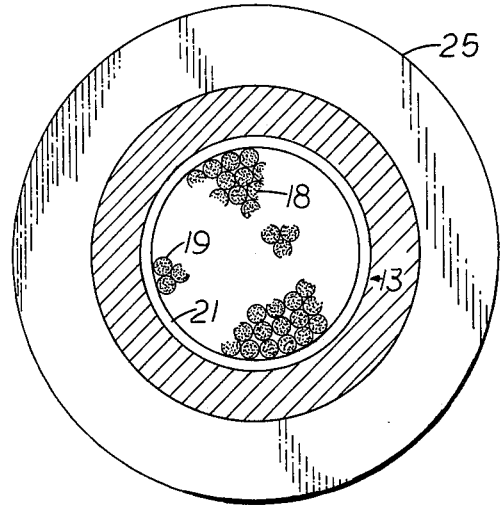
FIG. 4 is a cross-sectional view of the fiber-optic cable and a radiator adjacent the larger mirror on lines 4—4 of FIG. 3.
Figure 5:
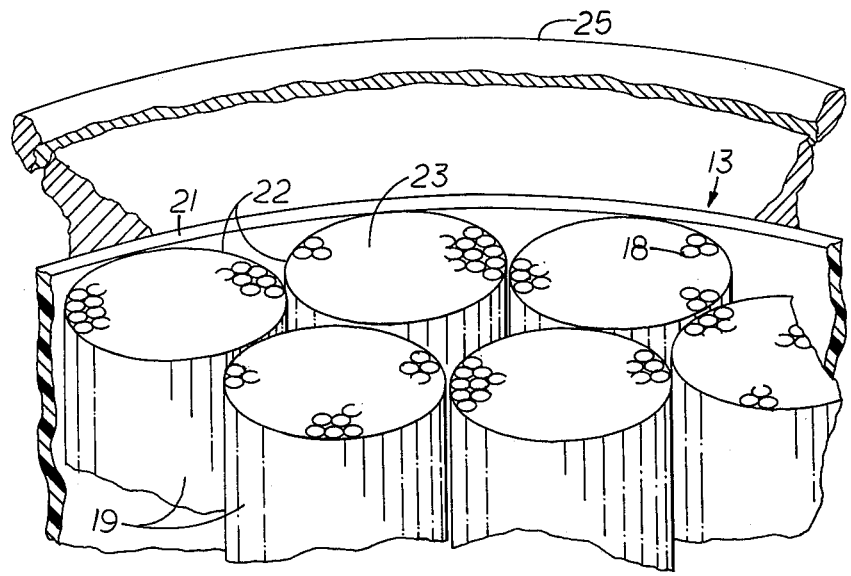
FIG. 5 is a magnified, fragmentary, perspective view of the upper end of the fiber-optic cable.

As shown in FIGS. 3 and 4, the fiber-optic cable 13 has a flexible, plastic cover 20 having an inner reflective surface 21. Within the covering, the fibers 24 are arranged into bundles 19 having the ends 18 of the fibers exposed about even with the inner surface of the mirror 11. In the magnified view of FIG. 5, the fibers having the ends 18 are shown arranged into the bundles 19, each bundle being surrounded by an opaque coating 22. In order to contain the energy within the cable 13, each of the coatings 22 has an inner reflective surface 23. The heat that is still produced within the input end of the cable 13, is dissipated to a large extent by a radiator 25 about the cable 13 adjacent the vertex of the mirror 11. The radiator 25 has a heat-conductive, cylindrical inner surface that fits in close thermal contact with the reflective coatings 21 and 22 about the fibers 24 of the cable 13, and a plurality of peripheral, spaced, conductive fins that extend radially from the cylindrical portion of the radiator 25.

In order to apply through lens 14 of FIG. 1 heat to the device 15 in an amount less than the maximum amount available, a pair of polarizing disks may be mounted at the output between the end of the cable 13 and the focusing lens 14. When a large quantity of heat is to be controlled, cooling means will need to be provided to cool the polarizing disks.

I claim:

1. A solar energy concentrating system comprising:
a collector of radiant energy, a fiber optic cable connected to said collector,
said collector having first and second concave reflectors, said second reflector being substantially smaller than said first reflector, each of said reflectors having a front reflecting surface,
means for rigidly supporting said second reflector at a predetermined distance in front of said first reflector, said reflecting surfaces facing each other,
control means connected to said first reflector, said control means being operable to track the sun and to turn said reflecting surface of said first reflector toward the sun, said first reflector being paraboloidal for concentrating radiant solar energy over a wave front coinciding with said reflecting surface of said second reflector,
said fiber-optic cable being connected to said collector by having a first end of said cable for input of radiant energy positioned through an opening in said first reflector to expose said first end to energy reflected from said reflecting surface of said second reflector, said second reflector being concave for concentrating radiant solar energy over a wavefront coinciding with said first end,
lens positioned to receive energy from a second end of said fiber-optic cable at a distance from said input for concentrating solar energy transmitted through said fiber-optic cable on an energy utilizing device, and
wherein said fiber-optic cable has a plurality of fibers of sufficient diameter to transmit infra-red rays of solar energy substantially independent modes, said fibers being divided into groups over a substantially length at said first end of said fiber-optic cable, and an opaque inwardly reflective coating surrounding each of said groups.

* * * * *